Apr. 3, 1923.

H. A. W. SMITH.
GENERAL UTILITY BOLT.
FILED FEB. 23, 1922.

1,450,460.

Inventor
H. A. W. Smith
By C. A. Snow & Co.
Attorneys

Patented Apr. 3, 1923.

1,450,460

UNITED STATES PATENT OFFICE.

HENRY A. W. SMITH, OF DANVILLE, VIRGINIA.

GENERAL UTILITY BOLT.

Application filed February 23, 1922. Serial No. 538,560.

*To all whom it may concern:*

Be it known that I, HENRY A. W. SMITH, a citizen of the United States, residing at Danville, in the county of Pittsylvania and State of Virginia, have invented a new and useful General Utility Bolt, of which the following is a specification.

This invention aims to provide a simple means whereby a bolt may be coupled to a nut, to prevent relative rotation between the aforesaid parts, the structure being capable of general use but being peculiarly useful in connecting relatively thin layers of metal such as are found, for instance, in an automobile body.

Figure 1:
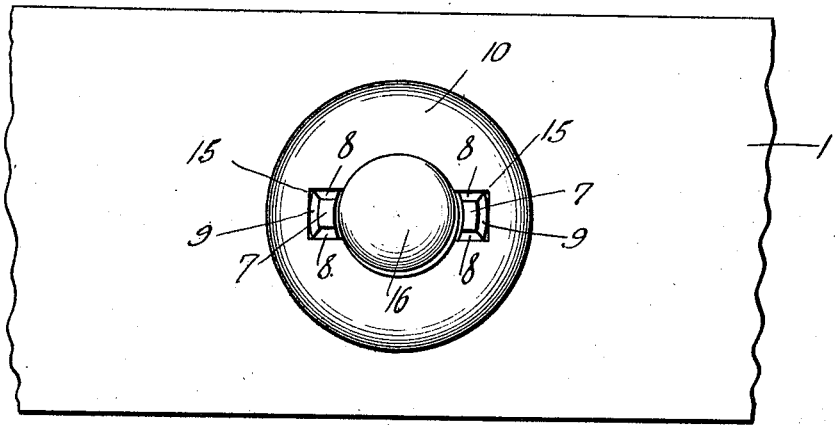
Figure 1:
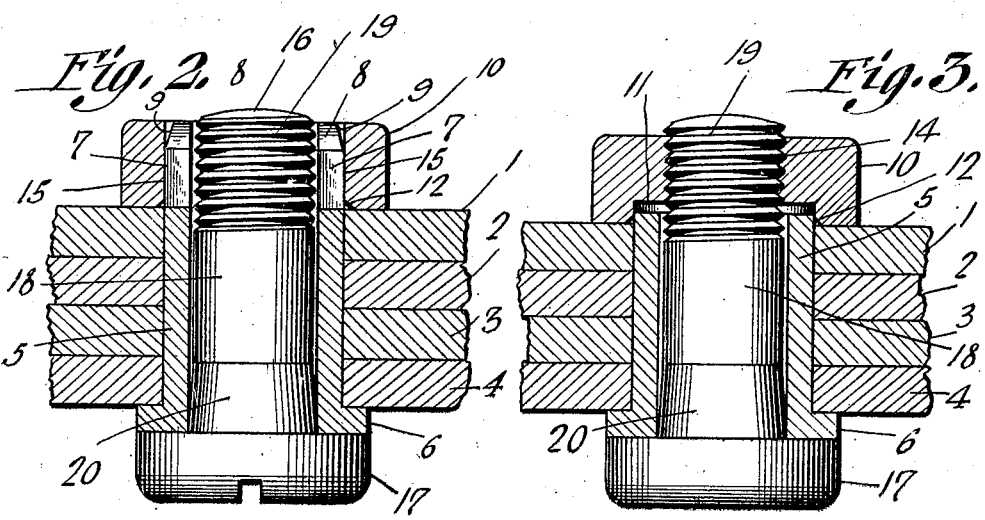
Figure 1:
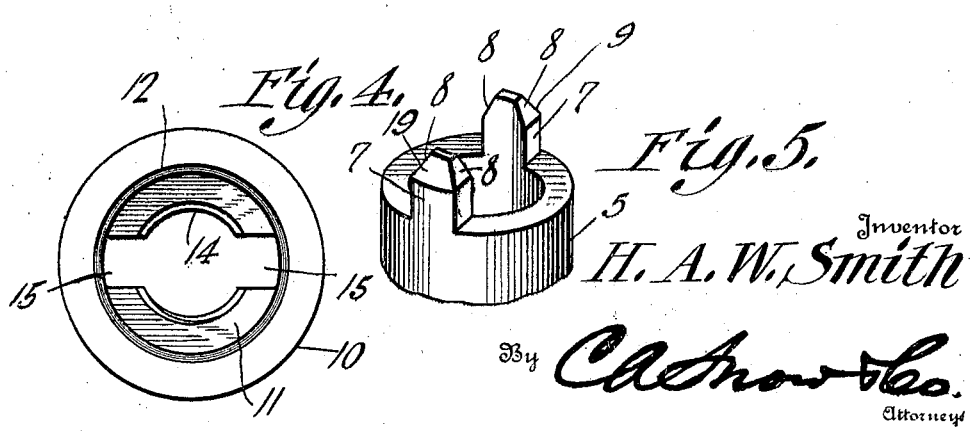

In the drawings:—Figure 1 shows in plan, a device constructed in accordance with the invention; Figure 2 is a section wherein parts appear in elevation; Figure 3 is a view similar to Figure 2 but showing a slightly different application of the invention; Figure 4 is a plan of the nut; Figure 5 is a perspective view showing one end of the bushing.

The device may be used with any desired number of layers 1, 2, 3 and 4, and includes a tubular bushing 5 extended through the said layers and provided at one end with an outstanding flange 6 cooperating with the layer 4. At its opposite end, the bushing 5 is supplied with oppositely disposed fingers 7 which are beveled on their sides as at 8, and on their outer surfaces as at 9.

A nut 10 is provided and cooperates with the layer 1, the nut being supplied on its under surface with a recess 11 which is large enough to receive the outer end of the bushing 5, the nut having a conical or beveled mouth 12 facilitating the entrance of the end of the bushing into the recess. The nut 10 is provided with a threaded opening 14 and has oppositely disposed seats 15, communicating with the opening 14 and of such a size as to receive the fingers 7 of the bushing 5 with a tight driving fit.

After the bushing 5 has been mounted in the layers, as shown in Figure 2, the nut 10 is driven on the fingers 7, as aforesaid, into engagement with the layer 1. Owing to the fact that the fingers 7 are beveled as shown at 8 and 9, the fingers may have a tight driving fit in the seats 15 of the nut 10, without bending the fingers inwardly. This statement requires some explanation, since, apparently, the fingers 7 may have a tight driving fit in the seats 15, if the fingers and the seats are shaped properly in cross section, even though the fingers are of the same cross section from end to end and are not beveled as at 8—9. Theoretically, the foregoing hypothesis is true; in practice it has no foundation. Recalling that the fingers 7 have a tight driving micrometric fit in the seats 15, it is obvious that when the nut 10 is placed on the ends of the fingers, and before the nut is driven on the fingers, the fingers will not register with the seats exactly, the result being either that the fingers are distorted at their ends, or that the nut is distorted slightly around the edges of the seats. In any event, when the nut 10 is driven home, on the fingers 7, the fingers at their ends do not stand parallel, but project inwardly toward the axis of the bushing 5. When a bolt 16, shown in the drawings, is inserted into the bushing 5, the threads on the bolt come into contact with the inwardly projecting fingers, the threads are mutilated, and the hold of the nut on the bolt is decreased accordingly.

All of the foregoing disadvantages are obviated if the fingers 7 are beveled as shown at 8—9, the beveled ends of the fingers being received in the seats 15, at the beginning of the driving operation, no matter how tightly the fingers may fit in the seats.

The bolt 16 comprises a head 17, a reduced shank 18, a threaded end 19 and a conical neck 20 connecting the shank 18 with the head 17. The bolt is introduced into the bushing 5 and is rotated to a seat, the head 17 engaging the flange 6 of the bushing 5, and the neck 20 of the bolt being wedged in the bushing; the bolt thus being coupled to the bushing, when the threaded end 19 of the bolt cooperates with the threaded opening 14 in the nut 10, the nut being held against rotation because the fingers 7 thereof are received in the seat 15 of the nut.

Since the shank 18 of the bolt 16 has a somewhat loose fit in the bore of the bushing 5, the shank may be inserted into the bushing, and may be moved about transversely, before the neck 20 has been wedged in the bushing, the transverse movement of the bolt aiding the operator in threading the bolt into the nut 10. In other words, the operator can feel out the threads of the nut 10 with the end of the bolt—an operation which, of course, is well understood.

Since the head 17 of the bolt 16 engages the flange 6 of the bushing 5, and not the layer 4, any relative movement, or working, between the layers 1, 2, 3 and 4, will have no effect in loosening the connection between the nut and the bushing, afforded by the wedging of the neck 20 in the bushing.

It is to be observed that that end of the bushing 5 which is adjacent to the nut 10 protects the threads 19 of the bolt, and neither the layer 1, nor anything else, can touch the threads. The threads, therefore, always remain in perfect condition, thereby enabling the nut to be tightened upon occasion.

After the layers have been held together for a time, it may be necessary to tighten the nut 10, due to wear in the layers, or to any other cause and, under such circumstances, as shown in Figure 3, the end of the bushing 5 can advance into the recess 11 of the nut 10, as shown in Figure 3. The nut, under any ordinary conditions, never bears against the end of the bushing 5, but can always be tightened down on the material, as Figure 3 will indicate.

It will be understood that when the parts are first assembled, as shown in Figure 2, the end of the bushing 5 is flush with the outer surface of the layer 1, the parts assuming the positions of Figure 3 after wear has taken place.

I claim:—

In a device of the class described, a bushing having a finger; a nut provided with a seat receiving the finger, and equipped with a recess adapted to receive the end of the bushing; a bolt in the bushing and threaded into the nut, the bolt being provided with a head cooperating with the bushing; and means for preventing relative rotation between the bolt and the bushing.

In testimony that I claim the foregoing as my own, I have hereto affixed my signature in the presence of two witnesses.

HENRY A. W. SMITH.

Witnesses:
 FULDA L. SEARCH,
 MASON B. LAWTON.